United States Patent
Linn et al.

(10) Patent No.: US 8,181,264 B2
(45) Date of Patent: May 15, 2012

(54) METHOD AND APPARATUS FOR DEFERRED SECURITY ANALYSIS

(75) Inventors: Christopher S. Linn, Palo Alto, CA (US); Jacques Vidrine, Sunnyvale, CA (US); Aaron Sigel, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1101 days.

(21) Appl. No.: 11/672,428

(22) Filed: Feb. 7, 2007

(65) Prior Publication Data

US 2008/0189796 A1    Aug. 7, 2008

(51) Int. Cl.
*H04L 9/00*    (2006.01)
*H04L 9/32*    (2006.01)
*G06F 7/04*    (2006.01)

(52) U.S. Cl. ............. 726/30; 726/22; 726/23; 726/24; 726/25; 726/26; 713/187; 713/188

(58) Field of Classification Search ............... 726/30
See application file for complete search history.

(56) References Cited

U.S. PATENT DOCUMENTS

| | | | |
|---|---|---|---|
| 6,757,685 B2 | 6/2004 | Raffaele et al. | |
| 2006/0021029 A1* | 1/2006 | Brickell et al. | 726/22 |
| 2006/0242712 A1 | 10/2006 | Linn et al. | |

OTHER PUBLICATIONS

"Description of How the Attachment Manager Works in Windows XP Service Pack 2", [online]. [retrieved Dec. 28, 2007]. Retrieved from the Internet: <URL: http://support.microsoft.com/kb/883260>, 5 pgs.

"Description of how the Attachment Manager works in Windows XP Service Pack 2", [Online]. Retrieved from the internet: <http://support.microsoft.com/kb/883260>, (2007), 8 pgs.

* cited by examiner

*Primary Examiner* — Longbit Chai
(74) *Attorney, Agent, or Firm* — Schwegman, Lundberg & Woessner, P.A.

(57) ABSTRACT

It has been discovered that identifying files introduced into a system, particularly those originating from external sources, as being subject to security evaluation and deferring the security evaluation until access or attempted access of the file reduces security vulnerabilities of a system. A file introduced into a processing system is tagged with a security tag if the file is introduced via a supervised introduction point and/or introduced by a supervised program. Upon access or attempted access of the tagged file, security evaluation is initiated on the file.

32 Claims, 11 Drawing Sheets

METHOD AND APPARATUS FOR DEFERRED SECURITY ANALYSIS

TECHNICAL FIELD

The present application relates generally to the technical field of security for computers and other processor-based systems; and more specifically to methods and apparatus performing security checks on files introduced to such systems when such systems attempt to access such introduced files.

BACKGROUND

Introducing content from sources external to a computer or other processing system, exposes the computer or system to a variety of threats. Such content may be introduced by a variety of mechanisms, such as by downloading files from the Internet, or through introduction of the content through a machine-readable media, such as a networked computer, a CD or DVD or other optical drive, or a Flash memory "thumb" drive. In many instances, threatening code is disguised as content sought after by a user (e.g., images, music, video clips, etc.). Typically, such content is presumed to be both desired and safe. However, there is always a risk that the content will contain malicious code, including code conventionally known in the field by a number of names, including "viruses", "worms", "Trojan horses", "spyware", "adware", and others. Such malicious code can have effects ranging from relatively benign, such as displaying messages on a screen, or taking control of limited functions of a device; to highly destructive, such as taking complete control of a device, running processes, transmitting and/or deleting files, etc. Thus, any assumption that desired content is safe leaves the system vulnerable to a user unwittingly executing threatening code when attempting to access the content assumed to be desired.

To address such vulnerabilities, security measures have been implemented to specifically address content downloaded or otherwise introduced to a system. In some such conventional systems, when downloading a file, the file is evaluated to determine if the file is of a type capable of hosting threatening code. If the file appears to be of a type that is potentially dangerous based on the evaluation, then the user is notified. However, identification of files as potentially dangerous based on file type may lead to spurious warnings displayed to a user, for example, who has purposefully downloaded an application. The proliferation of spurious warnings essentially eliminates the effectiveness of the warnings since users typically begin to disregard the warnings.

Warnings may also be ignored by users if the warnings fail to convey meaningful information. For instance, information about embedded files (e.g., archived files, compressed files, archived and compressed files, etc.) may not be accessible for security analysis. Information about embedded files may not be available until extracted or removed from the containing file, or may not be available until other data or information is available. Hence, a generic warning is displayed. A user typically dismisses the generic warning since there is no indication as to character of the containing file or embedded files. Dismissal of the generic warning is a security vulnerability since the user will likely access the file at a later date. This security vulnerability can be exploited since the user will likely have forgotten about the dismissed generic warning when activating the file at the later date. Accordingly, a technique for providing meaningful security, with minimal impact to the user experience would be useful.

SUMMARY

Identifying files as warranting evaluation for security risks, and then later evaluating the files, such as coincident with access of the files, allows for meaningful security and minimal disruption to the user experience. Upon introduction of a file into a processing system, a determination is made as to whether a security indication should be set for the file. The determination of whether to set a security indication can be made by a number of mechanisms, including, for example, consulting a set of heuristics, examining a security policy, etc. The security indication may be implemented by "marking" or "tagging" the file, to associate the file with a flag or value that represents the security indication, etc. Subsequently, such as coincident with an attempt to access the file, the security indication is seen and the file may be evaluated for possible threats. Dependent upon the outcome of the security evaluation, one or more subsequent security operations, such as launching a warning to a user, are then performed. Separating the security evaluation from introduction of the file, and delaying the security evaluation frees the user experience of unnecessary disruption and resource consumption for the security evaluation. Delaying security evaluation until access or attempted access of the file promotes effectiveness of such security operations since the delay generally aligns with user interest. Furthermore, the delay provides an opportunity to gather more information about the file.

BRIEF DESCRIPTION OF THE DRAWINGS

Some embodiments are illustrated by way of example and not limitation in the figures of the accompanying drawings in which.

DETAILED DESCRIPTION

The description that follows includes illustrative systems, methods, techniques, instruction sequences and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. For instance, examples are described below in the context of being performed on a single machine. However, multiple machines may be involved in implementing the security measures as described herein. In general, well-known instruction instances, protocols, structures and techniques have not been shown in detail.

For the purposes of this specification, "processing system" includes a system using one or more processors, microcontrollers and/or digital signal processors having the capability of running a "program", which is a set of executable machine code. Processing systems include communication and electronic devices such as cell phones, music players, and PDAs. Processing systems also include computers, or "computing devices" of all forms (desktops, laptops, palmtops, etc.). A "program" as used herein, includes user-level applications as well as system-directed applications or daemons.

Figure 1:
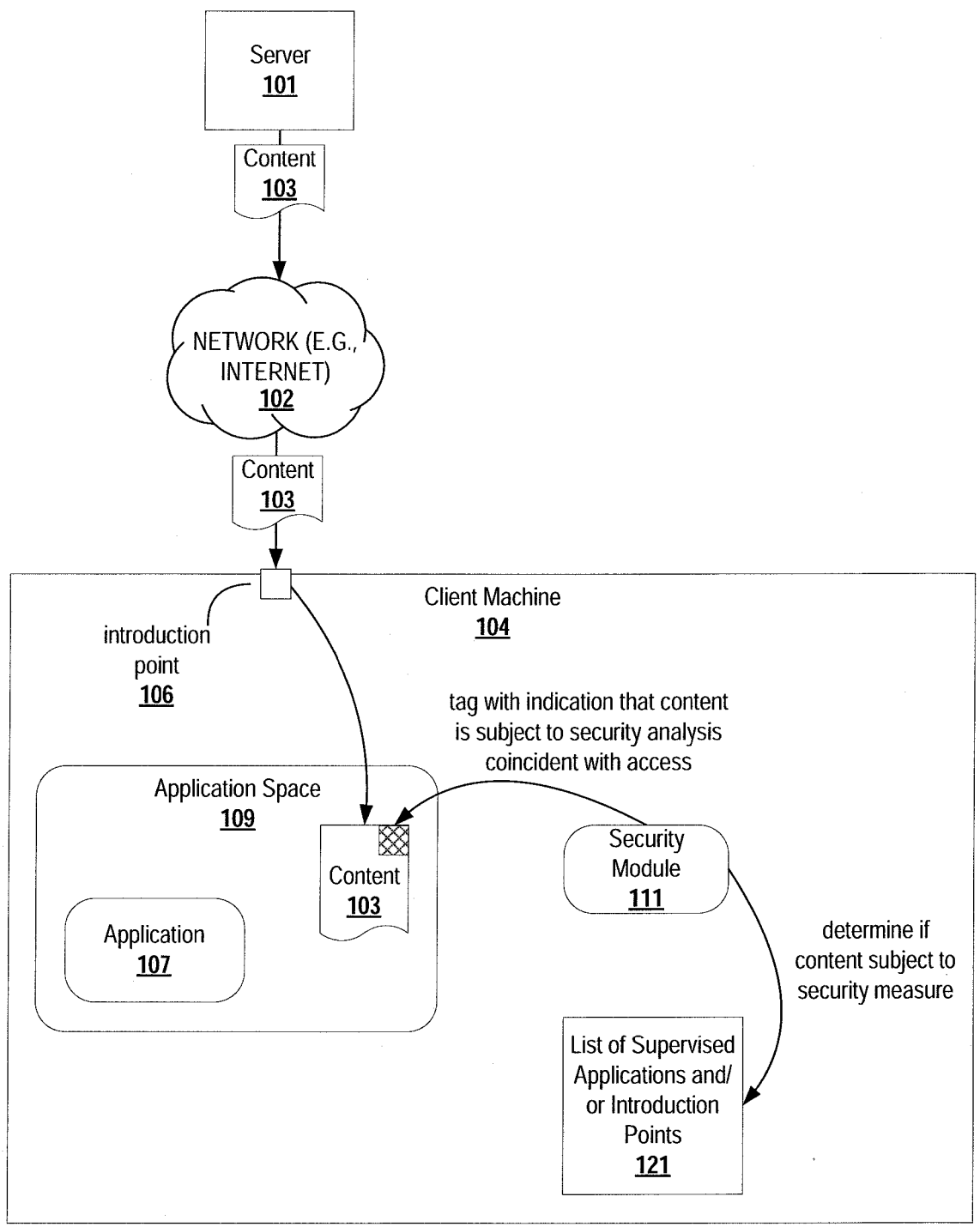
FIG. 1 depicts a conceptual diagram of an example of a system that introduces content to a client machine.

FIG. 1 depicts a conceptual diagram of an example of a system that introduces content to a client machine. A client machine 104 introduces content 103 (e.g., downloads a music file, downloads an image, receives a file via an FTP transmission, receives an attachment to an e-mail message, etc.) from a server 101 over a network 102 (e.g., any one or more of the Internet, a WAN, a LAN, etc.). Although introduction of content over a network is depicted, as will be apparent to those skilled in the art, the methods are equally applicable to content introduced through other machine-readable mechanisms, as discussed earlier herein. Further, although a client-server architecture is depicted, it should be appreciated that this embodiment is not limited to that structure, and may be realized in other system architectures (e.g., peer-to-peer networks, etc.). In the depiction of FIG. 1, the client machine 104 hosts an application 107, a security module 111, application space 109, and an identification of supervised applications and/or introduction points. In some implementations, this identification may be in the form of one or more lists or look-up tables (generically referred to herein as a "list") 121 of supervised applications and of introduction points to client machine 104. The content 103 is introduced by the application 107 (e.g., a browser, FTP application, e-mail client, etc.) into the application space 109 (e.g., memory space allocated to an application by an operating system) of the application 107. At some time, either prior to introduction of content 103, or upon introduction of content 103, the security module 111 accesses the list 121 of supervised applications and/or introduction points to determine any security actions to be taken. In some implementations, the list 121 will indicate applications for which security supervision is to be performed, such as because of the applications having been previously identified as capable of creating a security vulnerability for client machine 104. Any of a variety of techniques may be implemented to identify applications as capable of creating a security vulnerability (e.g., a security policy may be defined that identifies applications that introduce content from external sources as posing a risk; applications may be selected by a user, third party security consultant, and/or manufacturer as presenting exploitable security vulnerabilities; etc.). The list 121 may also indicate introduction points to external sources (e.g., network interfaces, ports, sockets, universal serial bus interfaces, etc.), or classes of introduction points (e.g., monitoring sockets but not ports), etc., identified as an exploitable security vulnerability. For example, a wireless interface of a computing machine may be identified as an exploitable security vulnerability. Applications and/or introduction points identified in the list 121 are subject to security supervision at least when introducing a file from an external source. Supervising of the identified applications and/or introduction points is a security measure against exploitation of the identified introduction points and/or applications. It should be noted that some preferred implementations will monitor different introduction points for different programs. Thus, for example, while some applications may be monitored for content introduced through any introduction point; another application may only be monitored for introduction from the internet or another network.

If the content 103 is received over an introduction point identified in the list 121, then the content 103 is tagged with a security indicator that indicates that the content 103 is subject to security evaluation at a later time. In some preferred implementations, the evaluation will be at the time of an "activation event." An activation event may be realized in a variety of forms (e.g., activation or opening of a file by a user by double clicking, activation of a file by an application linking to the file, loading the file into memory, etc.). But any attempt to open or execute ("activate") a file will be an activation event. Observation of an activation event may be realized with any of a variety of techniques (e.g., process registration technique, a function or method call, inter-process communications, etc.).

In particularly preferred implementations of the invention, the tagging of a file will be dynamic, in that any opening of a file containing further files therein will result in all such contained files being tagged. For example, if an archive file (such as a ZIP file), or a disc image file is opened, then each embedded file will be tagged for security screening, in the event such embedded files are subject to an activation event.

Figure 2:
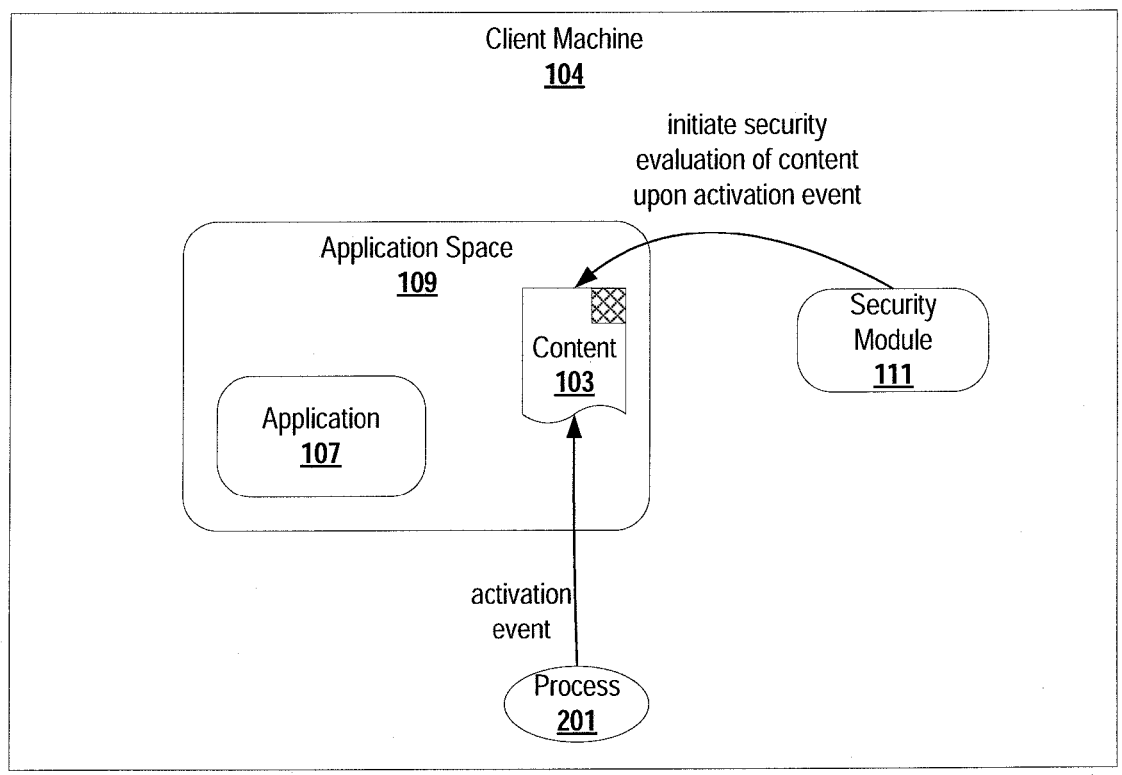
FIG. 2 depicts a conceptual diagram of one example of a system activating security analysis of content upon access of the content.

FIG. 2 depicts a conceptual diagram of one example of a system activating security analysis of content upon access of the content. A process 201 (e.g., an input process that receives input signals from a pointing device connected to the client machine 104; a process invoked or responding to an application or process requesting loading or linking of a dynamically linked library file; etc.) causes an activation event. The security module 111 observes the activation event and initiates security evaluation of the content 103 upon observation of the activation event.

Figure 3:
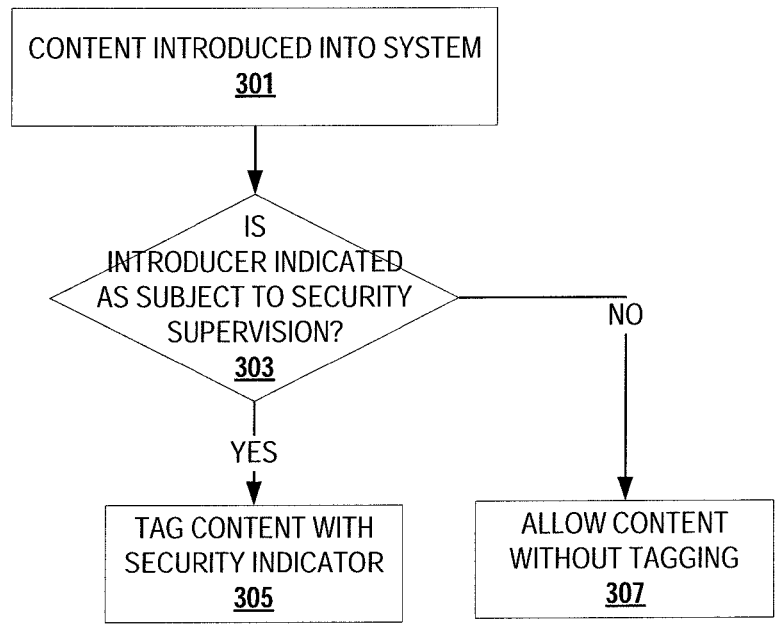
FIG. 3 depicts a flowchart of operations for tagging content with a security indicator.

FIG. 3 depicts a flowchart of operations for tagging content with a security indicator. At block 301, content is introduced into a system (e.g., pushed, pulled from a network; copied from a portable drive; extracted from an archive file; created locally; etc.). At block 303, it is determined if the program introducing the content is indicated as subject to security supervision. In preferred implementations, it is determined whether an introduction point is one from which content is to be subject to security supervision, at least for the program acquiring the content. If the introducer (application and/or introduction point) is not indicated as subject to security supervision, then control flows to block 307, where the content is allowed without tagging. If the introducer is indicated as being subject to security supervision, then control flows to block 305. At block 305, the file is tagged with a security indicator. Tagging content may be realized with any of a variety of techniques (e.g., a value (bit or bits) may be written to a field in a header of the file; a flag may be set for the file; a value may be pre-pended or appended to the file; etc.). In some preferred implementations, the tagging will be implemented through extended file attributes. In addition to tagging, additional measures may be taken to prevent activation of a file, such as changing access permissions of a file until the file is analyzed. Furthermore, additional information about the file (e.g., IP address of source, server name of source, creation date, modified date, author, source context, etc.) may be recorded for the later security evaluation.

Figure 4:
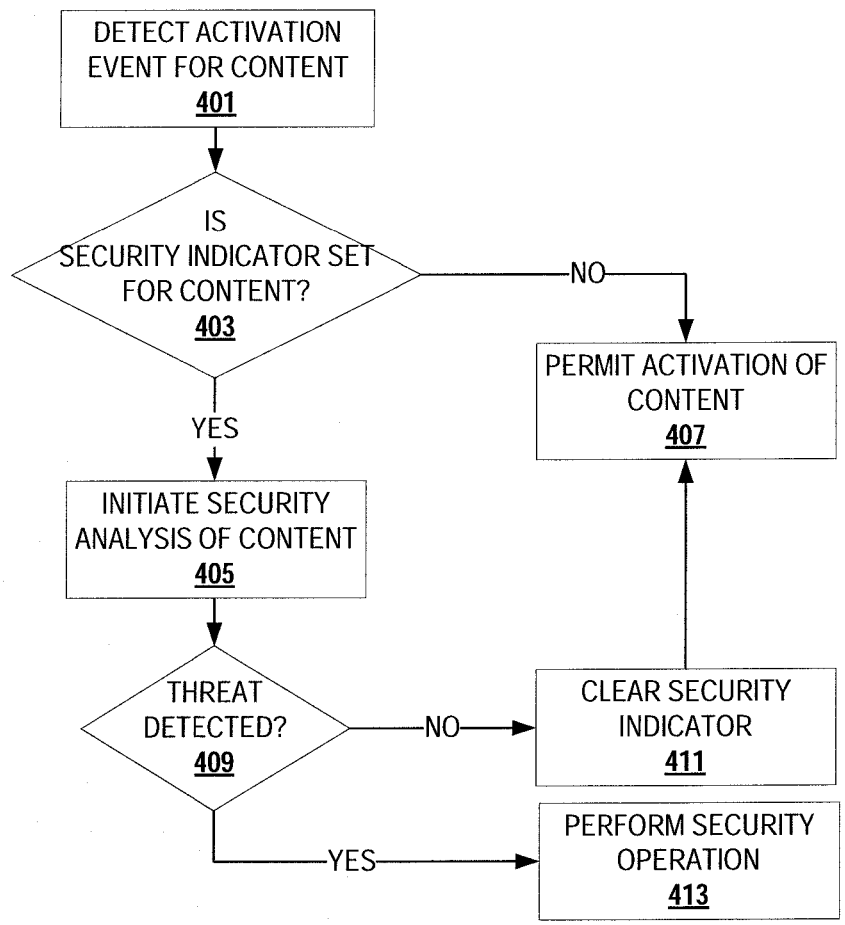
FIG. 4 depicts a flowchart of operations for initiating security analysis of a file tagged with a security indicator.

FIG. 4 depicts a flowchart of operations for initiating security analysis of a file tagged with a security indicator. At block 401, an activation event for content is detected. The activation event may be initiated by an application (e.g., a command submitted by a user, a call from an application that employs the content, etc.) or a user. For example, a File Open event or File Execute event, such as a double click event, is detected. Detecting an activation event may be realized in a variety of manners (e.g., code executed for a system call may incorporate functionality for initiating security analysis; a process or daemon that initiates the security analysis registers interest in the system call and is notified when the system call is executed; etc.). In preferred implementations on some computing systems, actions to access a file will be monitored at the Mandatory Access Control (MAC) layer, wherein system calls will generate events which may be monitored or "trapped" at the MAC layer. At block 403, it is determined whether a security indicator is set for the content. For example, the target (e.g., address, filename, offset, etc.) of the activation event is examined to determine if a value that represents the security indicator is set. If a security indicator is not set, then control flows to block 407, and activation of the content is permitted. If the security indicator is set, then control flows to block 405.

At block 405, security analysis of the content is initiated. For example, the content is analyzed for a threatening characteristic(s) (e.g., particular file type, inclusion of executable code, particular function name, etc.). At block 409, it is determined whether the security analysis detects a threat. If no threat is detected, then control flows to block 411. If a threat is detected, then control flows to block 413. The analyzing of the file to determine if it presents a threat may be done by any of many methods known to those skilled in the art. In one implementation, a system such as that implemented in version 10.4 of the MAC OS X, "Tiger" operating system from Apple Inc., will be implemented. Briefly, in that system, heuristics are applied to downloaded files to determine if the files are of a type which are considered to be "safe," if they are of a type known to be "unsafe," or if they are of an unknown type. For example, files which are executable files, such as applications, shell scripts, web archives and the like are recognized as having the potential to cause damage, and are thus identified as "unsafe." "Safe" files are generally those files that are either inherently safe because they cannot carry executable code and files that are known to be opened in a safe manner. Examples of inherently safe files are those which are truly image files (such a JPEG files), music files (such as MP3 files), etc. Other examples of safe files are those known to be opened in a safe manner, those files from trusted sources (e.g., signed files, file from previously identified sources, file previously uploaded to a trusted source or trusted web page, etc.), The particular criteria or methodology for analyzing files is not critical to the present invention, and may be selected from any of many permutations known or apparent to those skilled in the art, selected in accordance with the system(s) with which the analysis is to be made, the level of security desired and the acceptable system overhead in performing the analysis.

At block 411, the security indicator is cleared and control flows to block 407. Clearing of the security indicator may involve relocating the file, resetting a value, changing file permission, etc.

At block 413, one or more security operations are performed. For example, a warning to the user is launched, a virus scan is initiated (e.g., launch an anti-virus program), or the content is isolated ("placed in a sandbox"), etc. Subsequent action(s) can be tailored to the results of the security evaluation, such as displaying different levels of warnings dependent upon the result of a virus scan. Subsequent action(s) can also utilize the previously recorded information about the file or content.

For instance, source context information may have been recorded for a file and used to guide security operations. Source context information indicates source type information that provides context regarding acquisition of the file (i.e., allows determination of a conveyor of the file). A conveyor of a file is an object instance of an acquirer of the file (e.g., e-mail message, a web page, a encapsulating zip or archive file, etc.). For example, source context information may identify a particular e-mail message or web page that carried the file. As stated previously, the time lag between introducing a file into a system can lead to loss of context for the file. Such context may be helpful in identifying a course of action appropriate for security purposes. When a user accesses a file that was marked weeks earlier upon introduction into a system, the source context information can identify the web page that provided the file in question, which has probably been forgotten by the user, and thereby guide the user in making an appropriate security-based decision with regard to the file. In an implementation within the context of a web page context example, the address of the web site is recorded coincident with acquisition and/or marking of the file. Upon attempted activation of the file, the user will be referenced to the web page, such as by being notified of the recorded address, by being provided a link to the web page, or by the web page at the recorded address opened, etc. In another implementation within an e-mail message context example, information allowing access to an e-mail message is recorded coincident with a security indicator being set for an attachment of the e-mail message. When the user attempts to activate the attachment, the user is notified of the e-mail message (e.g., the e-mail message is displayed, the subject line and date of the e-mail message are displayed, etc.).

Access-based security evaluation of files may be realized with a myriad of techniques. The operations and/or functionality described above may be implemented in either one of hardware and software, or a combination of hardware and software. Furthermore, such functionality may be implemented wholly or partially at any of application level, operating system level, kernel level, etc. Every conceivable embodiment is not described herein to avoid obfuscation and maintain clarity. Examples of implementations in an application, in an operating system, partially in an operating system and partially in an application, in multiple applications, etc., are not described to avoid unnecessarily increasing complexity of the description. Although the following examples are described with reference to kernel space, these examples are intended to aid in understanding embodiments and not meant to limit embodiments to implementations in kernel space.

Figure 5:
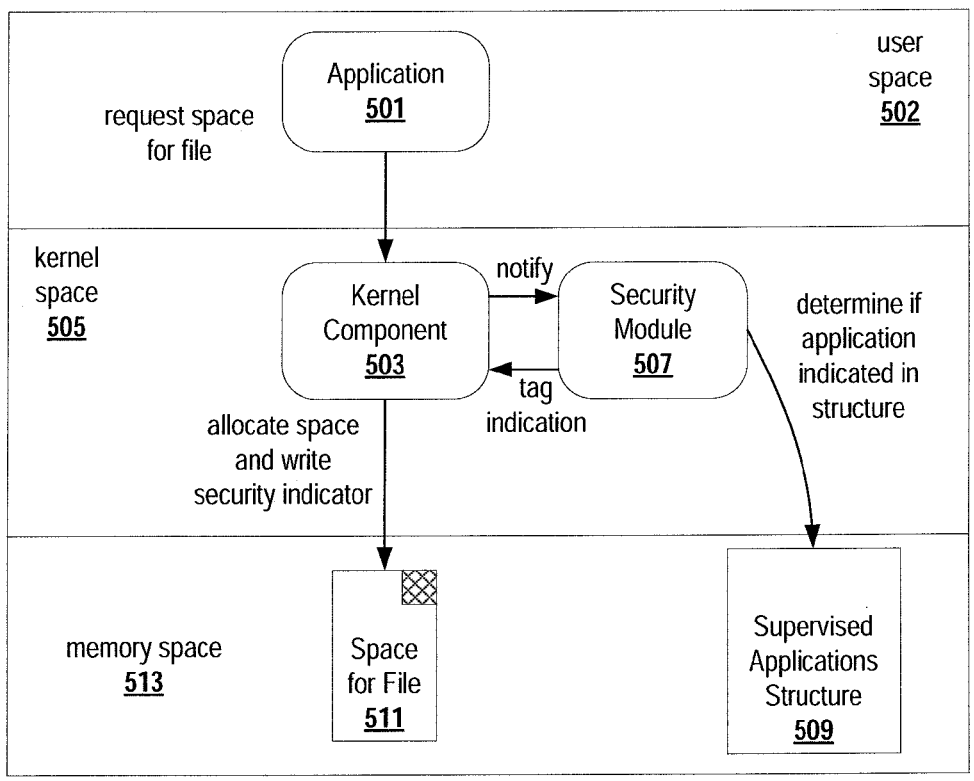
FIG. 5 depicts a conceptual diagram of one example of a system wherein a file is identified through actions in the kernel space of the system for later access-based security analysis.

FIG. 5 depicts a conceptual diagram of one example of a system wherein a file is identified through actions in the kernel space of the system for later access-based security analysis. An application 501, which is executing in user space 502, requests memory space for a file (e.g., makes a system call). A kernel component 503 (e.g., a function or method of a kernel; a process or daemon of the kernel; etc.) in kernel space 505 receives the request from the application 501. The kernel component 503 notifies a security module 507 of the request for memory space from the application 501. A variety of implementations are possible for such notification (e.g., a call to a security module that passes an identifier of an application as a parameter; an inter-process communication mechanism; etc.). The security module 507 determines if the application 501 is indicated in a structure 509 in memory space 513. The structure 509 indicates a set of one or more applications that have been identified as subject to security supervision. The structure 509 may be implemented as content addressable memory, or as any of a multitude of data structures instantiated in memory and/or storage, etc. Assuming that the application 501 is indicated in the structure 509, the security module 507 indicates that the file is to be tagged. For example, the security module 507 passes a message that includes the appropriate tag to be used. In another example, the security module 507 communicates that the application 501 is indicated in the structure 509, and the kernel component 503 (or another kernel component) takes appropriate action to cause the file to be tagged. The kernel component 503 allocates space 511 in the memory space 513. The memory space 513 is a conceptual representation of hardware memory and/or storage accessible by the kernel space 505 for either or both of the kernel space 505 and the user space 502. The kernel component 503 (or another kernel component, an operating system process, etc.) may write the tag into a designated location (e.g., a predefined offset from beginning of allocated space, a location designated by the security module 507, etc.) prior to the file being written into memory space 511. The kernel component 503 (or another kernel component, an operating system process, etc.) may write the tag after the file is written into memory space 511. The kernel component 503 (or another kernel component, an operating system process, etc.) may write the tag as the file is written into memory space 511.

Figure 6:
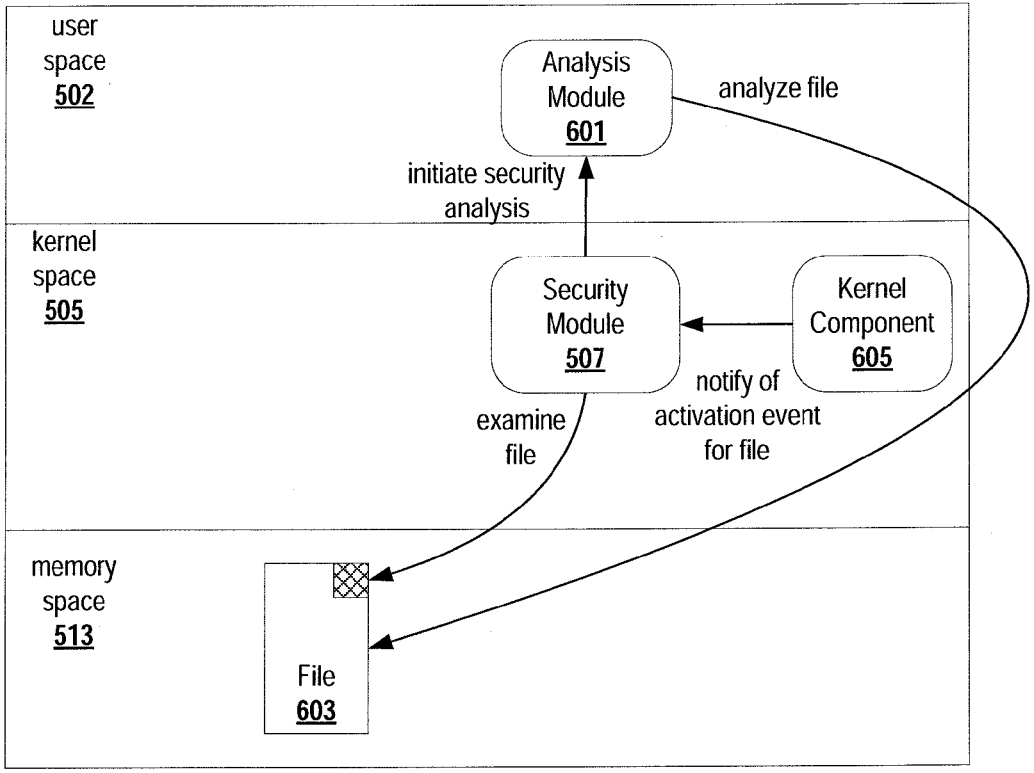
FIG. 6 depicts a conceptual diagram of one example of initiating in the kernel space, security analysis of a tagged file.

FIG. 6 depicts a conceptual diagram of one example of initiating in the kernel space, security analysis of a tagged file. A kernel component 605 notifies the security module 507 of an activation event for the file. For example, the kernel component 605 passes identifying information for the file (e.g., physical address, virtual address, file name, etc.) to the security module 507 coincident with the kernel component 605 being invoked or called. The activation event may be initiated from user space, kernel space, etc. For example, a user may perform an action intending to activate the file, an application or process may attempt to load and/or link the file, or an application or process may make a call to the file, etc. The security module 507 examines the identified file 603 in the memory space 513 at the allocated space 511. After discovering the tag, the security module 507 invokes an analysis module 601 to analyze the file 603. Although the analysis module 601 is depicted in FIG. 6 as executing in the user space 502, the analysis module 601 does not necessarily reside in user space (for example, the analysis module 601 may reside in the kernel space 505; the functionality of the analysis module 601 may be implemented by the security module 507; etc.). The analyzing of the file may be done by any of many methods known to those skilled in the art. The particular criteria or methodology for analyzing files is not critical to the present invention, and may be selected from any of many permutations known or apparent to those skilled in the art, selected in accordance with the system(s) with which the analysis is to be made, the level of security desired and the acceptable system overhead in performing the analysis.

Figure 7:
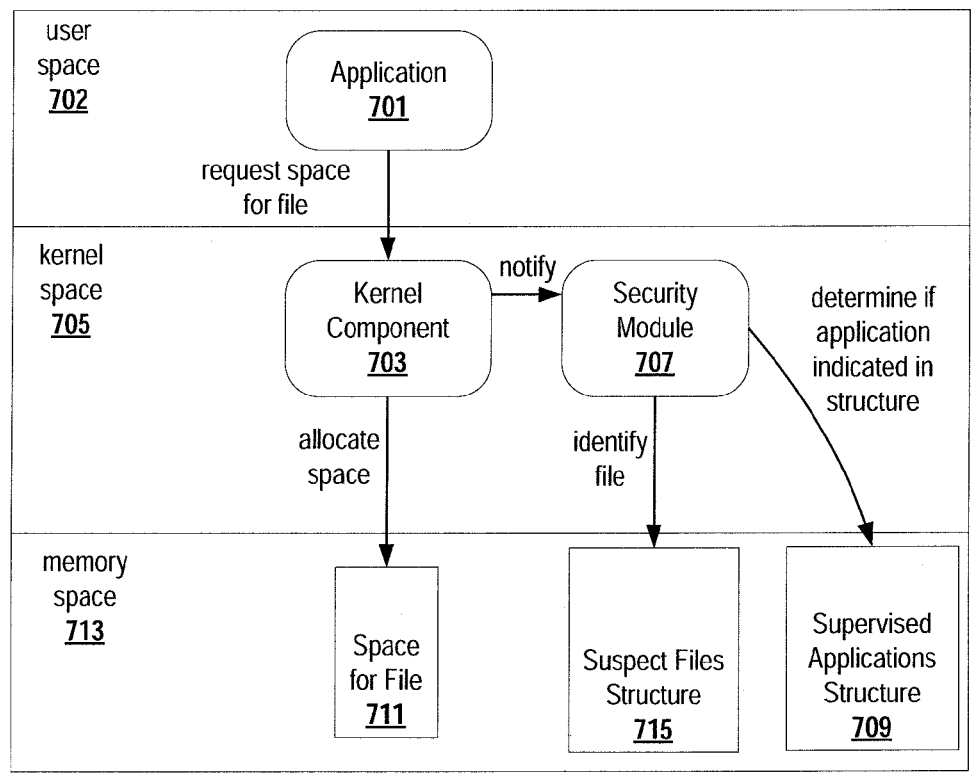
FIG. 7 depicts a conceptual diagram of one example of indicating a file as subject to access-based security evaluation in a structure separate from the file.
Figure 8:
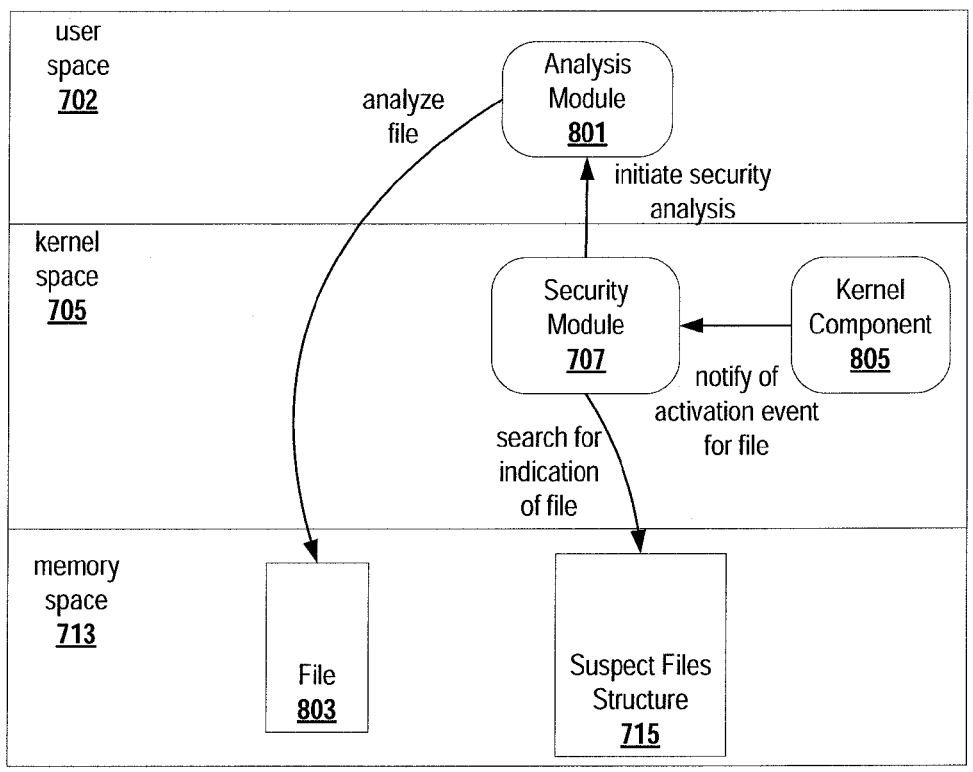
FIG. 8 depicts a conceptual diagram of one example of a security analysis of a file being initiated in kernel space using a suspect file structure.

As stated previously, it is not necessary to write into the memory space of a file to indicate that the file is subject to security evaluation upon access or attempted access of the file. FIGS. 7 and 8 depict an implementation in which the files are not tagged as discussed above, but wherein the identification of a file as subject to a security action is located in a separate structure. FIG. 7 depicts a conceptual diagram of one such method for indicating a file as subject to access-based security evaluation in a structure located separate from the file. In this example, in the event that an application 701 in a user space 702 requests memory space for a file, kernel component 703 in a kernel space 705 receives the request. The kernel component 703 notifies the security module 707 that the application 701 has requested space for a file. The security module 707 determines if the application 701 is indicated in a structure 709 in a memory space 713, where that structure 709 indicates supervised applications. For example, the security module 707 searches for a process identifier that corresponds to the application 701; a name of the application 701; etc. If the application 701 is identified in the structure 709, then the security module 707 identifies the file in a structure 715 in the memory space 713, wherein structure 715 indicates files that are "suspect" (i.e., introduced by an application and/or through an introduction point indicated as being supervised). Activation of a "suspect" file is contingent upon security analysis of the file. Files may be indicated in the structure 715 by address, name, etc. Independently, the kernel component 703 proceeds with allocating space 711 for the file to be written.

FIG. 8 depicts a conceptual diagram of one example of a security analysis of a file being initiated in kernel space using the above-described structure 715 to identify suspect files. Upon an activation event, a kernel component 805 notifies the security module 707 of an activation event for a file (e.g., an application has requested activation of a file, a user process has requested activation of a file, etc.). The security module 707 determines if the file is indicated in the structure 715. Assuming the activation event is for a file 803, which is the file written to the space 711, the security module initiates a security analysis of the file 803 by invoking an analysis module 801 in the user space 702. The analysis module 801 analyzes the file 803.

As previously stated, the above-described examples should not be used to limit embodiments. For instance, the above examples refer to setting a security indicator upon observing a request for memory space, but indicating or setting a security indicator may be coordinated with any one of a variety of file operations that coincide with introduction (e.g., a file directory update, update of a log, etc.). In addition, the Figures illustrate security modules in kernel space, which is one preferred implementation, but is not necessary for all embodiments. Security module functionality may be implemented in operating system space incident to or within an entity of the operating system (e.g., finder, helper, framework, etc.). Although the operating system is typically conceptualized as encapsulating kernel space, security module functionality may also be implemented partially in operating system space and partially in kernel space by multiple processes, multiple threads, multiple processing units, etc. Moreover, the security module may be realized in user space, such as being implemented in an application. In one implementation, a privileged application may register with an operating system process to receive notifications when another application introduces a file or content into the host processing system.

It should be noted that identification of an application or program as subject to security supervision (e.g., indicating an application in the supervised applications structure 709) does not require participation by the developer/publisher of the program. For instance, specific programs known to introduce content from an external source (e.g., Opera browser, Firefox® browser, Eudora® e-mail client, etc.) may be identified in the list by the entity that creates an operating system that includes the kernel component 703.

Even though not required, a mechanism may be implemented that utilizes third-party participation to update the "list" of programs subject to this security measure. In one implementation, the list is automatically updated with software updates from the entity that develops and/or maintains the operating system or from the developer of the program to be added to the list.

In addition, configuration does not need to be more complicated than merely identifying the programs. The security measure can just mark, tag or indicate every file created by identified programs. Casting such a wide security net that captures every file created by an identified program is not necessarily disruptive to a user. Subjecting every file created by the Firefox® browser, for example, to deferred security evaluation is typically not disruptive to a user experience, however, since most files created by a browser (e.g., cache files, temporary files, etc.) are essentially invisible to a user, and thus will not later be subject to an activation event. Moreover, capturing every file created by an identified program prevents certain types of files from contravening the security measure. For instance, flash files and plug-ins typically fall outside of the purview of most conventional security measures, since they are downloaded by another program, such as a browser. In contrast, embodiments described herein will indicate every file created by the browser (assuming the browser is subject to security supervision), including flash files and plug-ins, as subject to deferred security evaluation.

Figure 9:
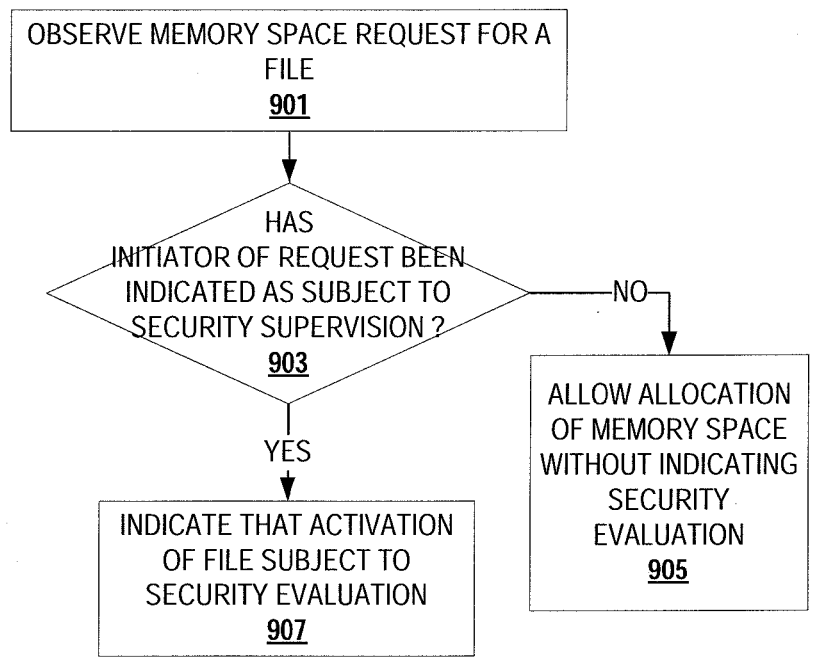
FIG. 9 depicts a flowchart of operations for indicating security evaluation coincident with file introduction as observed by memory space allocation.

FIG. 9 depicts a flowchart of operations for indicating security evaluation coincident with file introduction as observed by memory space allocation. At block 901, a request for memory space for a file is observed. At block 903, it is determined whether the initiator of the request has been indicated as subject to security supervision. If the initiator has been indicated as subject to security supervision, then control flows to block 907. If the initiator has not been indicated as subject to security supervision, then control flows to block 905.

At block 905, allocation of the memory space is allowed without an indication of security evaluation.

At block 907, activation of the file is indicated as subject to security evaluation.

In the above description, the act of "observing" a request for memory space or observing introduction of a file or content into a machine should not be interpreted as limiting embodiments. For example, the function or method that performs the introduction operation may also implement the functionality for indicating, thus making the act of "observing" implicit or incidental to the act of introducing.

Figure 10:
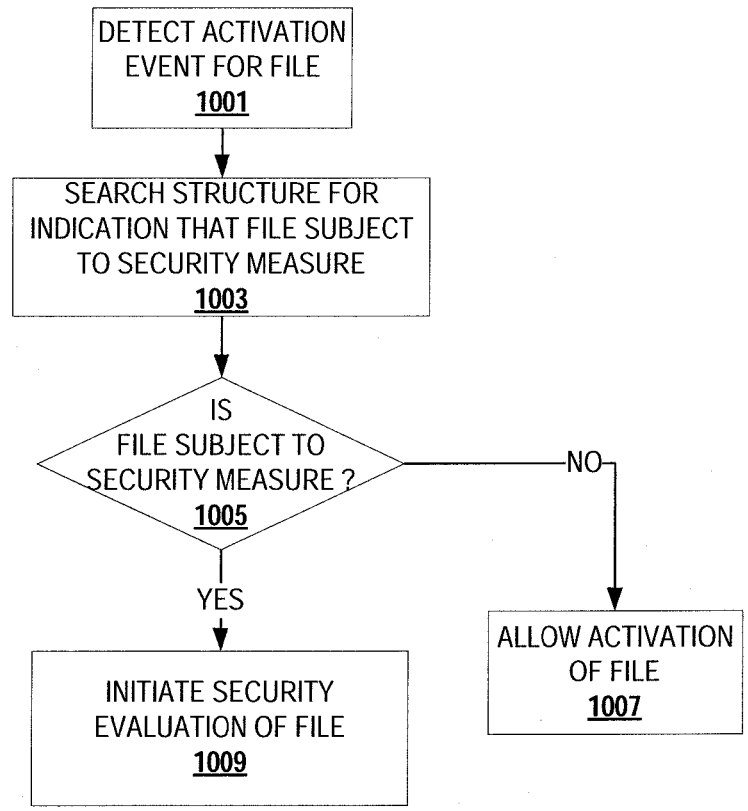
FIG. 10 depicts a flowchart of operations for initiating security evaluation of a file indicated as subject to security evaluation in a structure separate from the file.

FIG. 10 depicts a flowchart of operations for initiating security evaluation of a file indicated as subject to security evaluation in a structure separate from the file. At block 1001, an activation event is detected for a file. At block 1003, a structure, which is separate from the file, is searched for an indication that the file is subject to security evaluation. At block 1005, it is determined whether the file is subject to security evaluation. If the file is subject to security evaluation, then control flows to block 1009. If the file is not subject to security evaluation, then control flows to block 1007.

At block 1007, activation of the file is permitted.

At block 1009, security evaluation of the file is initiated.

Figure 11:
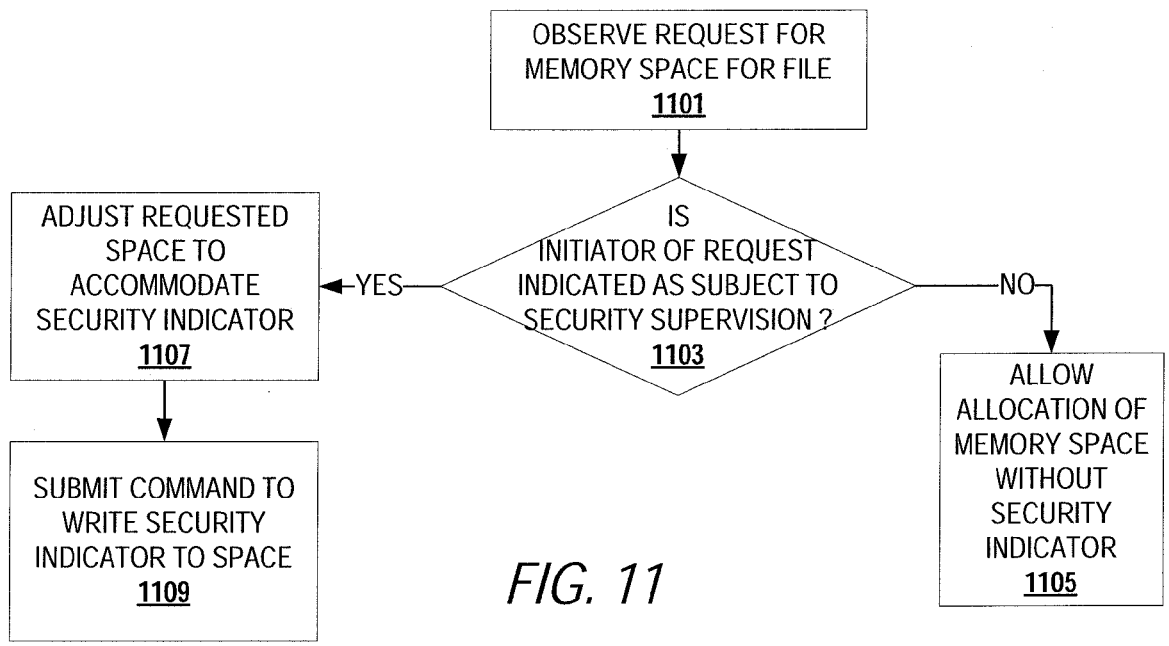
FIG. 11 depicts a flowchart of operations for accommodating a security indication in a file.

FIG. 11 depicts a flowchart of operations for accommodating a security indication in a file. At block 1101, a request for memory space for a file is observed. At block 1103, it is determined whether the initiator of the request is indicated as subject to security supervision. If the initiator is subject to security supervision, then control flows to block 1107. If the initiator is not subject to security supervision, then control flows to block 1105.

At block 1105, allocation of the memory space is allowed without a security indicator.

At block 1107, the requested space is adjusted to accommodate a security indicator. At block 1109, a command is submitted to write the security indicator into the allocated space. For example, the operation or operations that allocate space may be augmented to also write the security indicator; another kernel component may be called to perform writing of the security indicator; etc.

Figure 12:
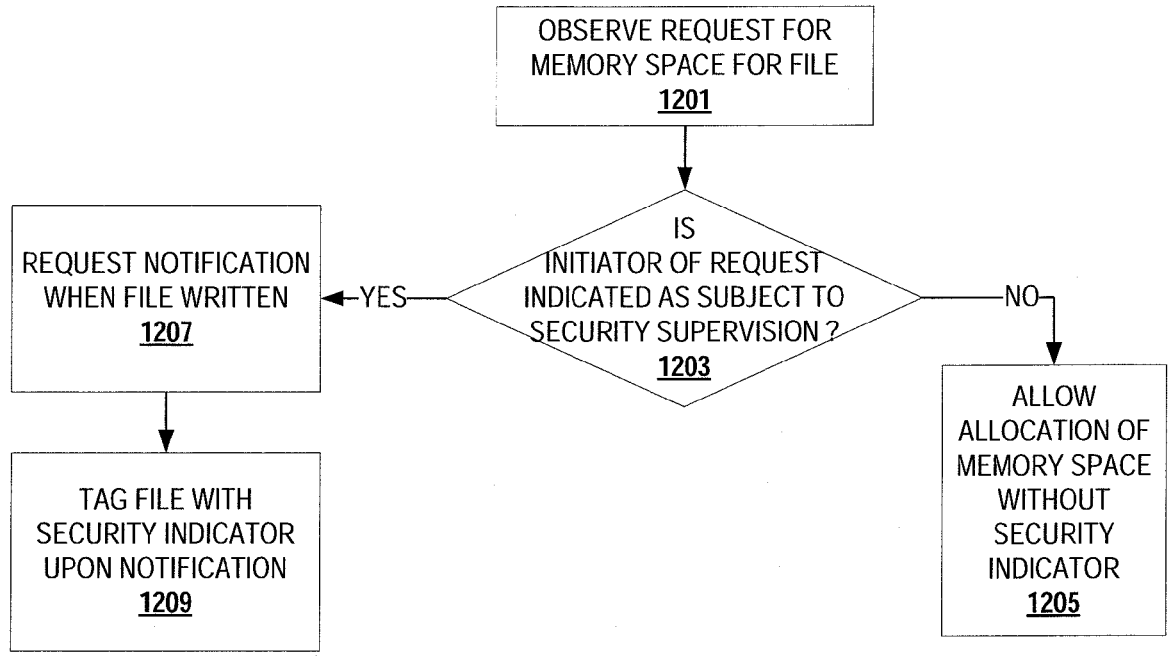
FIG. 12 depicts a flowchart of operations for marking a file header to indicate that the file is subject to security evaluation.

FIG. 12 depicts a flowchart of operations for marking a file header to indicate that the file is subject to security evaluation. At block 1201, a request for memory space for a file is observed. At block 1203, it is determined whether the initiator of the request is indicated as subject to security supervision. If the initiator is subject to security supervision, then control flows to block 1207. If the initiator is not subject to security supervision, then control flows to block 1205.

At block 1205, allocation of the memory space is allowed without a security indicator.

At block 1207, a notification is requested to notify when the file is written. At block 1209, the file is tagged with a security indicator upon receiving the requested notification. As previously stated, "tagging" a file may take a variety of forms. For example, the security indicator may be non-invasively associated with the file, such as writing the security indicator into extended attributes. In another implementation, the security indicator is written into the file, such as in a reserved field of a header.

Again, the above examples do not describe every possible embodiment. For example, the above examples may be interpreted as treating supervision of introduction points and applications as separate examples. However, a combination of introduction points and applications may be supervised. For example, setting a security indicator for a file may be dependent on determining whether the file is introduced by an application indicated as supervised and whether the application introduced the file via an introduction point of a class of introduction points being supervised. In addition, a security indicator or security indication is not necessarily a particular value, such as a flag or address. For example, code may be installed in a file header that is executed if a file is activated; a function or method call is installed in a file; access-based security evaluation may be indicated for a file by writing the file to a particular region of memory space; etc.

Figure 13:
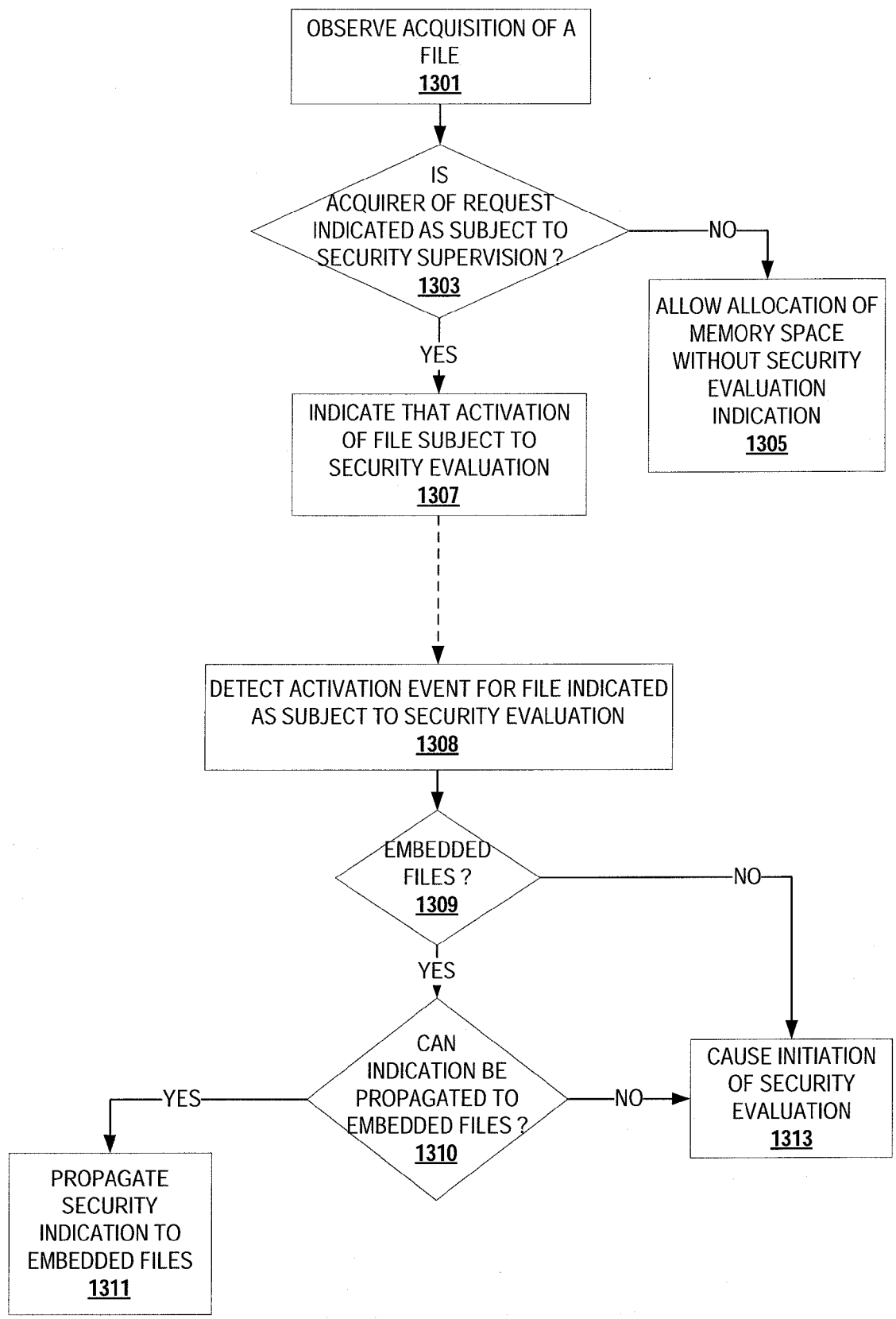
FIG. 13 depicts a flowchart of operations for propagating a security indicator to embedded files.

FIG. 13 depicts a flowchart of operations for propagating a security indicator to embedded files. At block 1301, introduction of a file is observed. At block 1303, it is determined whether the introducer (e.g., application, process, introduction point, etc.) of the request is indicated as subject to security supervision. If the introducer is subject to security supervision, then control flows to block 1307. If the introducer is not subject to security supervision, then control flows to block 1305.

At block 1305, allocation of the memory space is allowed without a security indicator.

At block 1307, a security indicator is set for the file. Passage of time is represented by a dashed line from block 1307 to block 1308. At a time after the security indicator has been set for the file (e.g., seconds, hours, days, weeks, etc.), an activation event is detected for the file at block 1308. At block 1309, it is determined if there are embedded files (e.g., the file is an archive of files, archive of compressed files, etc.) in the activated file. In one implementation, the structure of the file is examined to determine if the file contains embedded files. In another implementation, the activation event is examined to determine if the activation event accesses and/or operates upon embedded files (e.g., it is determined if the activation event unzips or extracts files). If there are embedded files, then control flows to block 1310. If there are no embedded files, then control flows to block 1313.

At block 1310, it is determined if the security indicator can be propagated to the embedded files. For example, certain archive files, such as a disk image, may not expose embedded files to a system for writing because they are read-only. If the security indicator can be propagated, then the security indicator is propagated to the embedded files at block 1311. Otherwise, control flows to block 1313. At block 1313, initiation of security evaluation of the file is caused. Most likely, although not necessarily, an activation event will be detected for one of the embedded files with a propagated security indicator. The detection of the activation event for the embedded file will possibly occur at a time far removed from the propagation of the security indicator. Hence, with respect to embedded files, the operations that may occur at three distinct points in time include: 1) acquisition of a file with embedded files and setting of a security indicator for the acquired file, 2) propagation of the security indicator to the embedded files, and 3) detection of an activation event for at least one of the embedded files and initiation of a security evaluation for the at least one embedded file.

Figure 14:
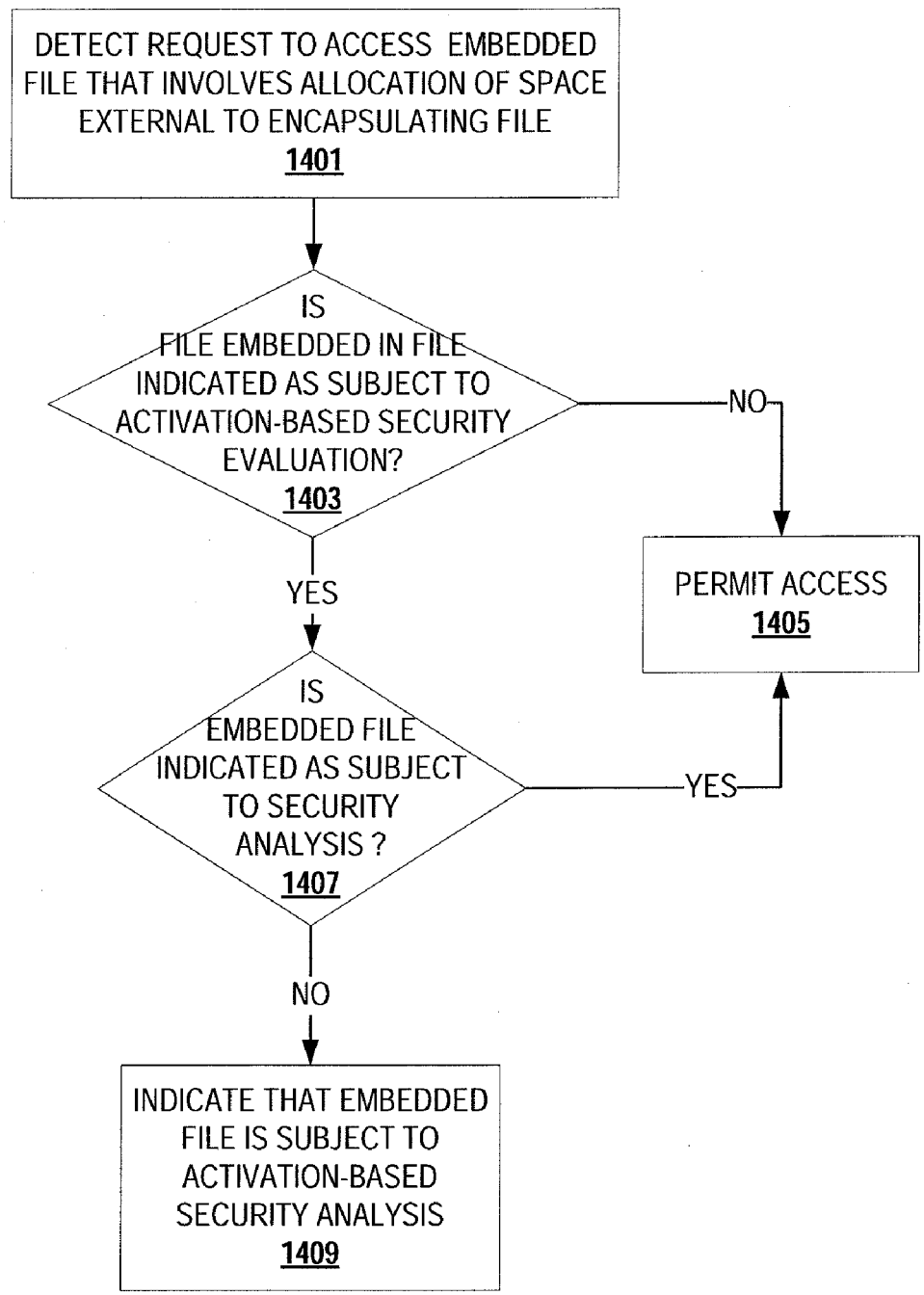
FIG. 14 depicts an example of a flowchart of operations for subjecting embedded files, which cannot be individually marked while embedded, to access-based security evaluation.

FIG. 14 depicts an example of a flowchart of operations for subjecting embedded files, which cannot be individually marked while embedded, to access-based security evaluation. At block 1401, a request to access an embedded file that involves allocation of memory space external to the encapsulating file (e.g., a disk image, remote file systems, etc.) for the embedded file is detected. "Access" of a file is not limited to activation (e.g., opening or execution). For example, a move or copy is detected for a file within a disk image (previously indicated as subject to the security measure, for example, by marking the mount point) or a decompressed file. At block 1403, it is determined if the encapsulating file is indicated as subject to access-based security evaluation. If the encapsulating file is so indicated, then control flows to block 1407. If the encapsulating file is not so indicated, then control flows to block 1405.

At block 1405, access to the embedded file is permitted.

At block 1407, it is determined if the embedded file is indicated as subject to security analysis. If the embedded file is indicated as subject to security analysis, then control flows to block 1405. If the attempted access involves activation, then security analysis will be initiated for the file. If the embedded file is not indicated as subject to access-based security analysis, then control flows to block 1409. At block 1409, it is indicated that the embedded file is subject to access-based security analysis. For example, a system move operation or copy operation includes such indicating or calls another component or module that causes such indicating.

Figure 15:
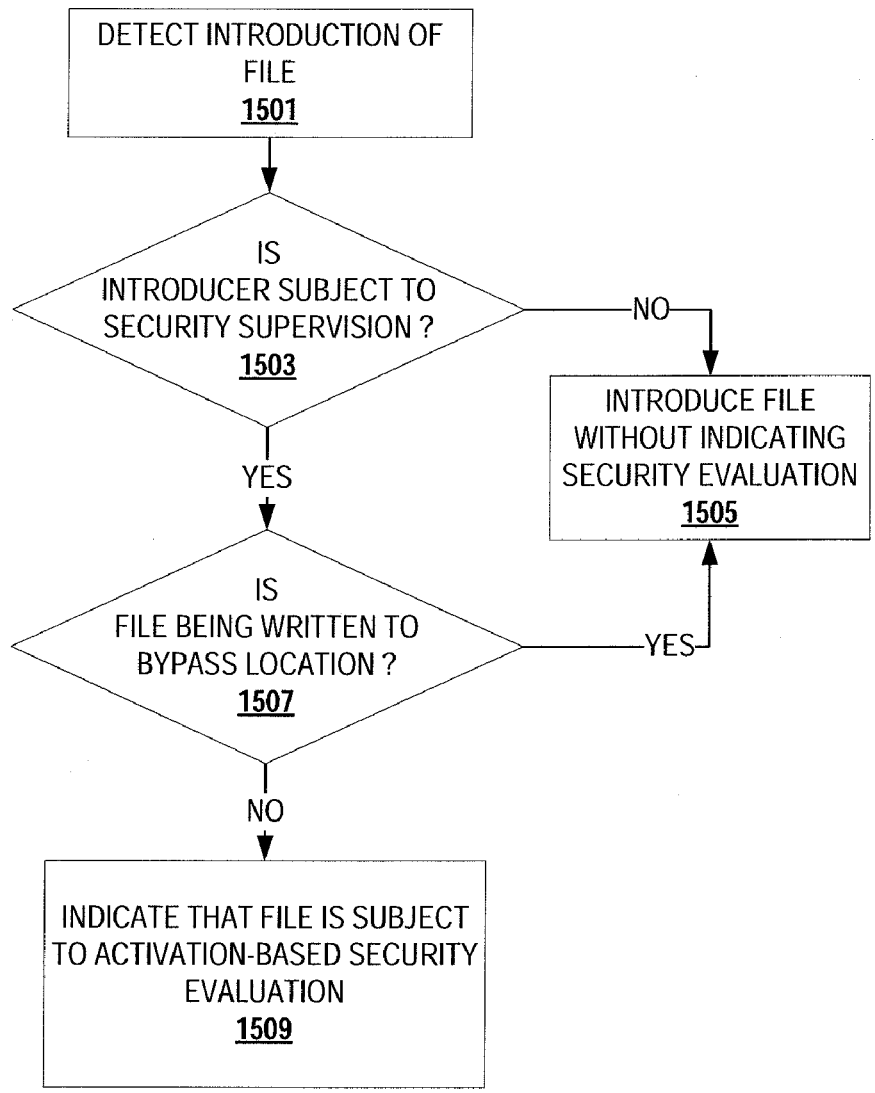
FIG. 15 depicts a flowchart of operations for bypassing access-based security analysis.

FIG. 15 depicts a flowchart of operations for bypassing access-based security analysis. At block 1501, introduction of a file is detected. At block 1503, it is determined if the introducer is subject to security supervision. If the introducer is not subject to security supervision, then control flows to block 1505. If the introducer is subject to security supervision, then control flows to block 1507.

At block 1505, the file is introduced without indication of access-based security evaluation.

At block 1507, it is determined if the file is being written to a security bypass location (e.g., a particular type of memory, a particular region of memory space, designated level in the memory hierarchy, a designated folder, etc.). If the file is not being written to a security bypass location, then control flows to block 1509. If the file is being written to a security bypass location, then control flows to block 1505. At block 1509, it is indicated that the file is subject to access-based security evaluation.

The described embodiments may be provided as a computing machine program product, or software, that may include a machine-readable medium having stored thereon instructions, which may be used to program a processing system (or other electronic devices) to perform a process according to embodiments of the invention, whether presently described or not, since every conceivable variation is not enumerated herein. A machine readable medium includes any mechanism for storing or transmitting information in a form (e.g., software, processing application) readable by a machine (e.g., a computer, a personal data assistant, a cellular phone, a media center, game console, etc.). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Figure 16:
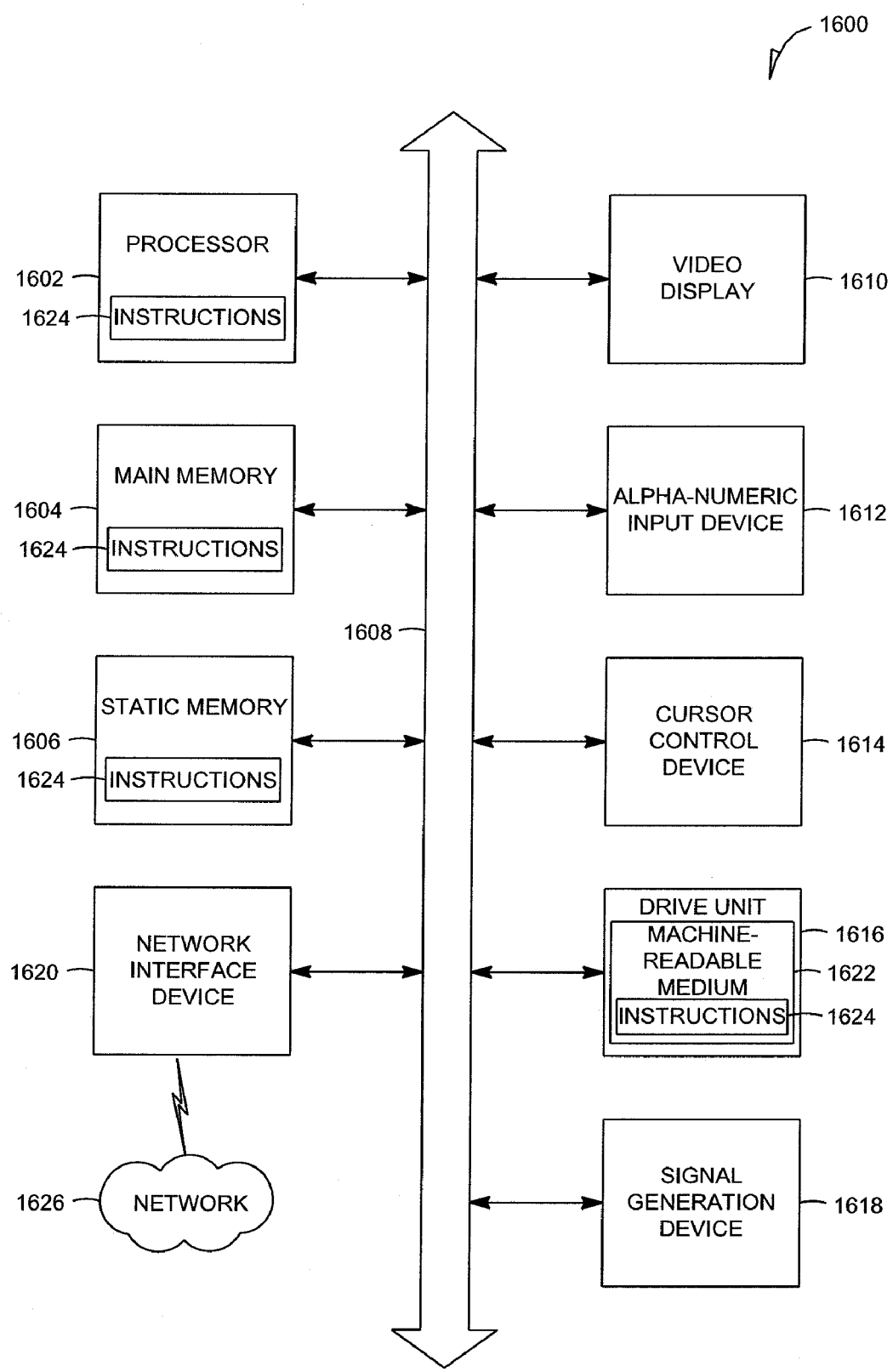
FIG. 16 depicts a diagrammatic representation of a machine in the example form of a processing system 1600 within which a set of instructions, for causing the machine to perform any of the functionality discussed herein, may be executed.

FIG. 16 depicts a diagrammatic representation of a machine in the example form of a processing system 1600 within which a set of instructions, for causing the machine to perform any of the functionality discussed herein, may be executed. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 1600 includes a processor 1602 (e.g., a central processing unit (CPU) a graphics processing unit (GPU) or both), a main memory 1604 and a static memory 1606, which communicate with each other via a bus 1608. The processing system 1600 may further include a video display unit 1610 (e.g., a liquid crystal display (LCD) or a cathode ray tube (CRT)). The processing system 1600 also includes an alphanumeric input device 1612 (e.g., a keyboard), a cursor control device 1614 (e.g., a mouse), a disk drive unit 1616, a signal generation device 1618 (e.g., a speaker) and a network interface device 1620.

The disk drive unit 1616 includes a machine-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the processing system 1600, the main memory 1604 and the processor 1602 also constituting machine-readable media.

The software 1624 may further be transmitted or received over a network 1026 via the network interface device 1620.

While the invention(s) is (are) described with reference to various implementations and exploitations, it will be understood that these embodiments are illustrative and that the scope of the invention(s) is not limited to them. In general, techniques for access-based security evaluation of files introduced from a source external to a machine may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of managing files received by a processing system from a source external to the processing system, the method comprising the acts of:
    introducing a file into the processing system for retention in a memory space of the processing system;
    under control of the operating system of the processing system, tagging the file with a machine readable security tag; and
    upon an activation event for the tagged file in the processing system, implementing the processing system to detect the machine readable security tag and to initiate a security evaluation of the file;
    wherein the introduction of the file is initiated in a user space of the operating system of the processing system.

2. The method of claim 1 further comprising the acts of:
    determining that an introduction point to the processing system is one of a set of introduction points to the processing system previously identified as subject to security supervision; and
    determining that the file is received via the introduction point; and
    wherein said act of tagging is in accordance with said act of determining that the file is received via the introduction point.

3. The method of claim 2 further comprising the act of identifying the set of introduction points.

4. The method of claim 1 further comprising the acts of:
    identifying a set of applications as subject to security supervision; and
    determining that a first application of the set of applications receives the file,
    wherein said act of tagging is contingent on determining that the first application is one of the identified set of applications.

5. The method of claim 1 further comprising the act of determining that the file is associated with the security tag prior to initiating the security analysis.

6. The method of claim 1, wherein the security analysis comprises at least one of a set of acts consisting essentially of analyzing a file type of the file, analyzing content of the file, and determining source of the file.

7. The method of claim 1, wherein said act of tagging comprises at least one of a set of acts consisting essentially of marking the file, installing executable code in the file that implements said act of initiating, and setting a value in the file.

8. The method of claim 1 further comprising the act of recording additional information about the file coincident with said act of tagging the file, wherein the additional information is selected from a group consisting essentially of one or more of, the
    network address of a source of the file,
    the creation date of the file,
    the server name of the source of the file,
    the date the file was last modified,
    the author of the file, and
    the source context for the file, wherein the source context information allows determination of a conveyor of the file.

9. A method of operating a processing system to provide a measure of security as to files received from sources external to the processing system, the method comprising the acts of:
    coincident with introduction of a file into the processing system for retention in a memory space therein, under control of an operating system of the processing system indicating that the file is subject to an access-based security evaluation by tagging the file with a machine readable security tag;
    receiving a command in the processing system to access the file with said machine readable security tag retained therein; and
    initiating the access-based security evaluation for the file coincident with and in response to access of the file at the processing system;
    wherein the introduction of the file is initiated in a user space of the operating system of the processing system.

10. The method of claim 9, wherein the security measure comprises at least one act selected from a set consisting essentially of generating a notification, quarantining the file, denying access to the file, and preventing activation of the file.

11. The method of claim 9, wherein said access of the file comprises one of a set consisting essentially of an open event, an execute event, a link event, and a transmit event.

12. The method of claim 9 further comprising the acts of:
    determining whether an application that introduces the file is indicated as subject to security supervision,
    wherein said act of indicating is in accordance with said act of determining.

13. The method of claim 12, wherein the application is selected from a set consisting essentially of an e-mail client, a browser, a virtual machine, and a file transfer protocol application.

14. The method of claim 9 further comprising the acts of: determining that the file contains at least a second file; and indicating that the second file is subject to access-based security evaluation.

15. The method of claim 14, wherein said act of indicating is performed upon attempted access of the second file, wherein the attempted access is selected from a set consisting essentially of moving the second file, copying the second file, discovering the second file, and identifying the second file.

16. A method of securing a processing system comprising the acts of:
through use of a processor, under control of an operating system of the processing system, detecting a request for memory space in the processing system for a file from an application;
coincident with said act of detecting, under control of the operating system of the processing system, using a processor to establish a machine readable indication that activation of the file is contingent on a security analysis of the file by taming the file with a machine readable security tag; and
upon receiving an activation event the processing system for the file with said machine readable security tag, using a processor to initiate the security analysis of the file coincident with the attempted activation of the file;
wherein the request for memory space is initiated in a user space of the operating system of the processing system.

17. The method of claim 16 further comprising the act of recording information for the file including at least one of a set of information items consisting essentially of the file source, the introduction time, the source of the application, the privilege level of the application, and the source context, wherein the source context information for the file indicates an object instance of the application that conveys the file.

18. The method of claim 17 further comprising the act of bypassing the act of indicating if the file is written to a pre-defined security bypass location.

19. The method of claim 16 further comprising the act of identifying the application as subject to security supervision.

20. A machine-readable storage device comprising a computing machine program product in the form of a plurality of instructions encoded in the machine-readable storage device, the instructions comprising:
operating system instructions executable to provide an operating system for a processing system, the operating system instructions comprising kernel level operations for such a processing system, the operating system instructions further comprising,
a first sequence of instructions executable to set a security indication that indicates activation of a file introduced from an external source is subject to security analysis by tagging the file with a machine readable security tag; and
a second sequence of instructions executable to initiate security evaluation of a file coincident with attempted access of the file if the file to be accessed is tagged with a machine readable security tag;
wherein the introduction of the file is initiated in a user space of the operating system of the processing system.

21. The machine-readable storage device of claim 20, wherein the instructions further comprise:
a third sequence of instructions executable to identify a set of applications subject to security supervision, wherein the first sequence of instructions are further executable to set the security indication if an application that introduces the file is determined to be within the set of applications.

22. The machine-readable storage device of claim 20, wherein the instructions further comprise a third sequence of instructions executable to identify a set of one or more introduction points into a processing system that are subject to security supervision, wherein the first sequence of instructions are further executable to set the security indication if the file is introduced into the processing system via one of the set of identified introduction points.

23. The machine-readable storage device of claim 20, wherein the instructions further comprise a third sequence of instructions executable to determine whether the file is written to a pre-defined safe location configured as a bypass of the security analysis and executable to bypass execution of the first sequence of instructions if so determined.

24. The machine-readable storage device of claim 20, wherein the first sequence of instructions is further executable to indicate that one or more files embedded within a file are subject to the security measure if the file has been indicated as subject to the security analysis.

25. The machine-readable storage device of claim 20, wherein the instructions further comprise a third sequence of instructions executable to set a security indication for an embedded file coincident with an operation selected from a set of operations consisting essentially of copying, moving, extracting, displaying, and identifying the one or more embedded files.

26. A machine-readable storage device having instructions encoded therein, which when implemented by a machine, cause operations to be performed which comprise:
a first plurality of predetermined operations of at least one application, which when executed provide a set of predetermined functionality of the machine to a user; and
operating system functionality of an operating system including kernel level system operations, the operating system functionality further comprising the operations of,
monitoring files of at least one application that receives files from a source external to the machine;
associating a security indicator with a file received by the at least one application from a source external to the machine by tagging the file with a machine readable security tag;
coincident with an operation to access a file with a machine readable security tag, evaluating the file for a possible security threat;
wherein the introduction of the file is initiated in a user space of the operating system.

27. The machine-readable storage device of claim 26, wherein the predetermined functionality provided by the first plurality of predetermined operations is at least one of a set consisting essentially of file management functionality, machine resource management functionality, communication functionality, and machine resource interface functionality.

28. The machine-readable storage device of claim 26, wherein the second plurality of operations further comprise:
propagating a security indicator associated with a file having an associated security indicator to one or more files embedded within the file.

29. The machine-readable storage device of claim 26 further comprising a third plurality of comprising recording information about the received file, the information selected from a group consisting essentially of one or more of,
the network address of a source of the file, the server name of the source of the file,
date information for the file,
author information for the file, and
source context information for the file, wherein the source context information for the file indicates an object instance of the application that conveys the file.

30. An apparatus comprising:
a set of one or more processors operable to execute a set of one or more applications that introduce files into the apparatus, and to execute instructions of an operating system of the apparatus;
means for causing the operating system to set a security indication for a file introduced by a first application of the set of applications if the first application is indicated in a set of one or more applications previously identified as subject to security supervision by tagging the file with a machine readable security tag; and
means for causing the operating system to initiate the security evaluation coincident with attempted access of a file if the file to be accessed is tagged with a machine readable security tag;
wherein the introduction of the file is initiated in a user space of the operating system of the apparatus.

31. A method of operating a processing system to provide a measure of security as to files received from sources external to the processing system, the method comprising the acts of:
coincident with introduction of a file into the processing system for retention in a memory space therein, under control of an operating system of the processing system indicating that the file is subject to an access-based security evaluation by tagging the file with a machine readable security tag;
receiving a command in the processing system to access the file retained therein; and
initiating the access-based security evaluation for the file coincident with and in response to access of the file at the processing system with said machine readable security tag;
wherein the operating system interfaces with the hardware of the processing system.

32. An apparatus comprising:
a set of one or more processors operable to execute a set of one or more applications that introduce files into the apparatus, and to execute instructions of an operating system of the apparatus;
means for causing the operating system to set a security indication for a file introduced by a first application of the set of applications if the first application is indicated in a set of one or more applications previously identified as subject to security supervision by tagging the file with a machine readable security tag; and
means for causing the operating system to initiate the security evaluation coincident with attempted access of a file if the file to be accessed is tagged with a machine readable security tag;
wherein the operating system interfaces with the hardware of the apparatus.

* * * * *